United States Patent
Wolleschensky et al.

(10) Patent No.: US 6,888,148 B2
(45) Date of Patent: May 3, 2005

(54) ARRANGEMENT FOR THE OPTICAL CAPTURE OF EXCITED AND /OR BACK SCATTERED LIGHT BEAM IN A SAMPLE

(75) Inventors: Ralf Wolleschensky, Schoeten (DE); Michael Kempe, Kunitz (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 10/081,096

(22) Filed: Feb. 21, 2002

(65) Prior Publication Data

US 2004/0031930 A1 Feb. 19, 2004

(30) Foreign Application Priority Data

Dec. 10, 2001 (DE) .......................................... 101 60 976

(51) Int. Cl.[7] .............................................. G02B 21/00
(52) U.S. Cl. ................... 250/458.1; 250/459.1
(58) Field of Search .................... 250/458.1, 459.1, 250/461.1, 461.2; 356/318, 317, 417

(56) References Cited

U.S. PATENT DOCUMENTS

| | | | | |
|---|---|---|---|---|
| 4,734,578 A | * | 3/1988 | Horikawa | 250/234 |
| 4,769,551 A | * | 9/1988 | Hamashima et al. | 250/548 |
| 4,827,125 A | * | 5/1989 | Goldstein | 250/234 |
| 5,537,247 A | * | 7/1996 | Xiao | 359/368 |
| 5,936,764 A | * | 8/1999 | Kobayashi | 359/385 |
| 6,088,097 A | * | 7/2000 | Uhl | 356/318 |
| 6,356,088 B1 | * | 3/2002 | Simon et al. | 324/752 |
| 6,462,345 B1 | * | 10/2002 | Simon et al. | 250/458.1 |

* cited by examiner

*Primary Examiner*—Constantine Hannaher
*Assistant Examiner*—Otilia Gabor
(74) *Attorney, Agent, or Firm*—Reed Smith LLP (57) ABSTRACT

Arrangement for the optical detection of light radiation which is excited and/or backscattered in a specimen in a microscope, wherein the specimen illumination is focused in and/or in the vicinity of a pupil plane of the beam path between the specimen plane and detection plane and apparatus is provided in this plane for spatially separating the illumination light from the detection light, wherein fluorescent light and/or luminescent light and/or phosphorescent light and/or diffusely scattered illumination light coming from the specimen is detected, and the apparatus for spatial separation comprises at least a reflecting first portion and at least a transmitting second portion, wherein the reflecting portion serves to couple in the illumination light and the transmitting portion serves to pass the detection light in the detection direction or the transmitting portion serves to couple in the illumination light and the reflecting portion serves to couple out the detection light.

22 Claims, 9 Drawing Sheets

ARRANGEMENT FOR THE OPTICAL CAPTURE OF EXCITED AND /OR BACK SCATTERED LIGHT BEAM IN A SAMPLE

CROSS-REFERENCE TO RELATED APPLICATIONS

This application claims priority of German application No. 101 60 976.0, filed Dec. 10, 2001, the complete disclosure of which is hereby incorporated by reference.

BACKGROUND OF THE INVENTION a) Field of the Invention

The invention is directed to a method in microscopy, particularly fluorescence microscopy, laser scanning microscopy, fluorescence correlation spectroscopy, and near-field scanning microscopy, for the investigation of predominantly biological specimens, preparations and associated components. This includes methods for screening active ingredients (high throughput screening) based on fluorescence detection. Therefore, simultaneous investigations of specimens with multiple fluorophores in real time by means of simultaneous illumination of the specimen in a plurality of points on the specimen are possible with overlapping fluorescence spectra also in three-dimensional structures of thick specimens.

b) Description of the Related Art

A typical area of application of light microscopy for examining biological preparations is fluorescence microscopy (Pawley, "Handbook of Biological Confocal Microscopy"; Plenum Press 1995). In this case, determined dyes are used for specific labeling of cell parts.

Figure 1A:
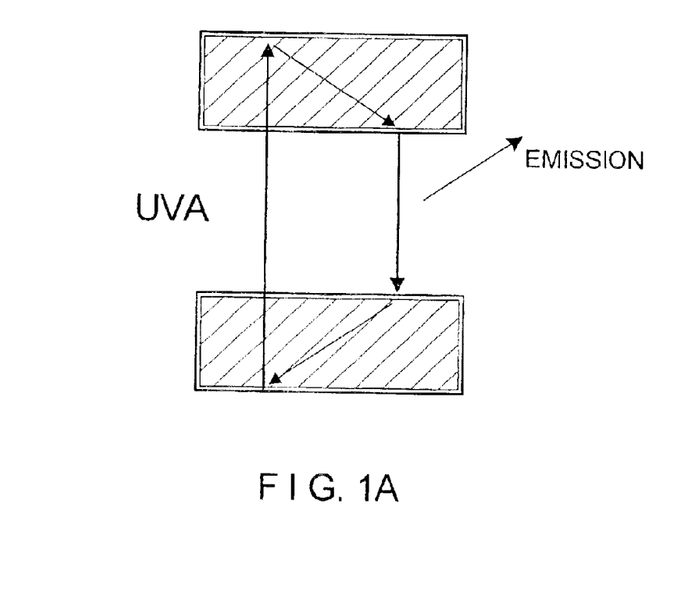
FIG. 1A shows, in representational form, the operation of single-photon absorption by dye molecules.

The irradiated photons having a determined energy excite the dye molecules from the ground state to an excited state by the absorption of a photon. This excitation is usually referred to as single-photon absorption (FIG. 1a). The dye molecules excited in this way can return to the ground state in various ways. In fluorescence microscopy, the most important is the transition with emission of a fluorescence photon. Because of the Stokes shift, there is generally a red shift in the wavelength of the emitted photon in comparison to the excitation radiation; that is, it has a greater wavelength. Stokes shift makes it possible to separate the fluorescence radiation from the excitation radiation.

The fluorescent light is split off from the excitation radiation by suitable dichroic beam splitters in combination with blocking filters and is observed separately. This makes it possible to show individual cell parts that are dyed with different dyes. In principle, however, several parts of a preparation can also be dyed simultaneously with different dyes which bind in a specific manner (multiple fluorescence). Special dichroic beam splitters are used again to distinguish between the fluorescence signals emitted by the individual dyes.

Figure 1B:
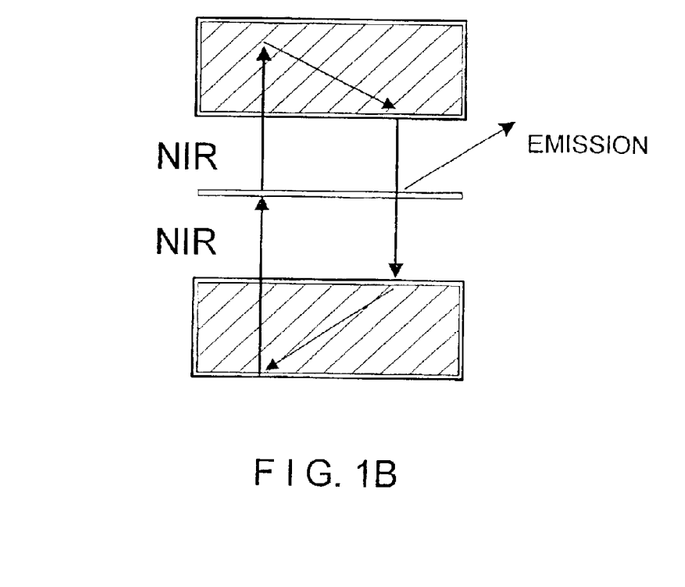
FIG. 1B shows, in representational form, the operation of multiphoton absorption by dye molecules.

In addition to excitation of dye molecules with a high-energy photon (single-photon absorption), excitation with a plurality of low-energy photons is also possible (FIG. 1b). The sum of energies of the single photons corresponds approximately to that of the high-energy photon. This type of excitation of dyes is known as multiphoton absorption (Corle, Kino, "Confocal Scanning, Optical Microscopy and Related Imaging Systems", Academic Press 1996). However, the dye emission is not influenced by this type of excitation, i.e., the emission spectrum undergoes a negative Stokes shift in multiphoton absorption; that is, it has a smaller wavelength compared to the excitation radiation. The separation of the excitation radiation from the emission radiation is carried out in the same way as in single-photon excitation.

Figure 2:
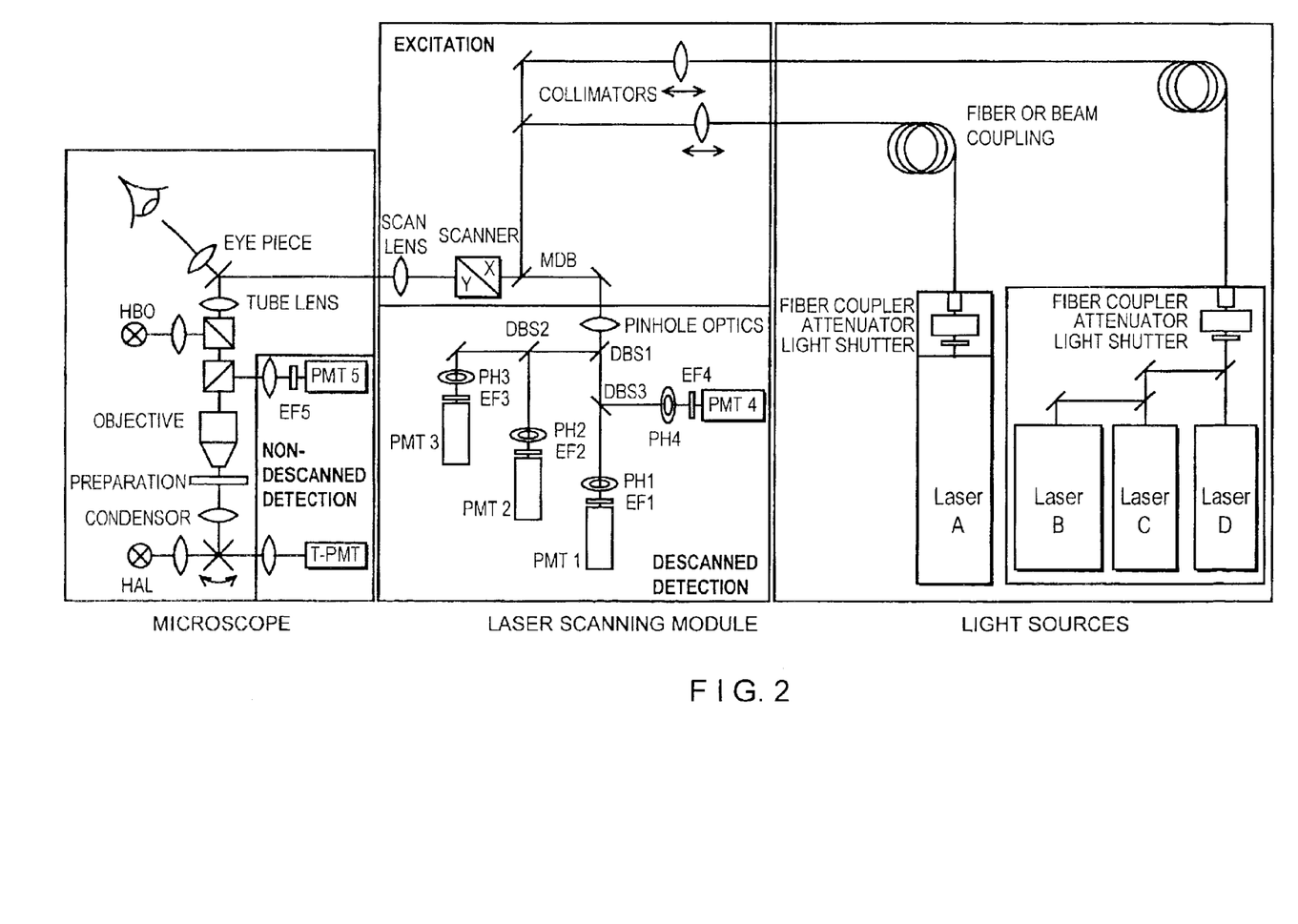
FIG. 2 shows, in schematic form, a confocal laser scanning microscope.

The prior art will be explained more fully in the following by way of example with reference to a confocal laser scanning microscope (LSM) (FIG. 2).

An LSM is essentially composed of four modules: light source, scan module, detection unit and microscope. These modules are described more fully in the following. In addition, reference is had to DE19702753A1.

Lasers with different wavelengths are used in an LSM for specific excitation of different dyes in a preparation. The choice of the excitation wavelength is governed by the absorption characteristics of the dyes to be investigated. The excitation radiation is generated in the light source module. Various lasers (argon, argon/krypton, Ti:Sa lasers) are used for this purpose. Further, the selection of wavelengths and the adjustment of the intensity of the required excitation wavelength is carried out in the light source module, e.g., using an acousto-optic crystal. The laser radiation subsequently reaches the scan module via a fiber or a suitable mirror arrangement.

The laser radiation generated in the light source is focused in the preparation in a diffraction-limited manner by the objective via the scanner, scan optics and tube lens. The scanner is moved over the specimen point by point two-dimensionally in x-y direction. The pixel dwell times when scanning over the specimen are mostly in the range of less than one microsecond to several seconds.

In confocal detection (descanned detection) of fluorescent light, the light emitted from the focal plane (specimen) and from the planes located above and below the latter reaches a dichroic beam splitter (MDB) via the scanner. This dichroic beam splitter separates the fluorescent light from the excitation light. The fluorescent light is subsequently focused on a diaphragm (confocal diaphragm/pinhole) located precisely in a plane conjugate to the focal plane. In this way, fluorescent light components outside of the focus are suppressed. The optical resolution of the microscope can be adjusted by varying the size of the diaphragm. Another dichroic blocking filter (EF) which again suppresses the excitation radiation is located behind the diaphragm. After passing the blocking filter, the fluorescent light is measured by means of a point detector (PMT).

When using multiphoton absorption, the excitation of the dye fluorescence is carried out in a small volume in which the excitation intensity is particularly high. This area is only negligibly larger than the detected area when using a confocal arrangement. Accordingly, a confocal diaphragm can be dispensed with and detection can be carried out directly after the objective (nondescanned detection).

In another arrangement for detecting a dye fluorescence excited by multiphoton absorption, descanned detection is carried out again; but this time the pupil of the objective is imaged in the detection unit (nonconfocal descanned detection).

From a three-dimensionally illuminated image, only the plane (optical section) located in the focal plane of the objective is reproduced by the two detection arrangements in connection with corresponding single-photon absorption or multiphoton absorption. By recording a plurality of optical sections in the x-y plane at different depths z of the specimen, a three-dimensional image of the specimen can be generated subsequently in computer-assisted manner.

Accordingly, the LSM is suitable for examination of thick preparations. The excitation wavelengths are determined by the utilized dye with its specific absorption characteristics. Dichroic filters adapted to the emission characteristics of the dye ensure that only the fluorescent light emitted by the respective dye will be measured by the point detector.

Currently, in biomedical applications, a number of different cell regions are labeled simultaneously by different dyes (multifluorescence). In the prior art, the individual dyes can be detected separately based on different absorption characteristics or emission characteristics (spectra). For separate detection, an additional splitting of the fluorescent light of a plurality of dyes is carried out with the secondary beam splitters (DBS) and a separate detection of the individual dye emissions is carried out in various point detectors (PMT x).

Flow cytometers are used for investigating and classifying cells and other particles. For this purpose, the cells are dissolved in a liquid and are pumped through a capillary. In order to examine the cells, a laser beam is focused in the capillary from the side. The cells are dyed with different dyes or fluorescing biomolecules. The excited fluorescent light and the backscattered excitation light are measured. The separation of the fluorescence signal of the specimen from the excitation light is carried out by means of dichroic beam splitters (NDB, see FIG. 2). The art is described in "Flow Cytometry and Sorting", second edition, M. R. Melamed, T. Lindmo, M. L. Mendelsohn, eds., Wiley & Sons, Inc., New York, 1990, 81–107.

The size of the cells can be determined from the backscattered signal. Different cells can be separated and/or sorted or counted separately by means of the spectral characteristics of the fluorescence of individual cells. The sorting of the cells is carried out with an electrostatic field in different capillaries. The results, that is, for example, the quantity of cells with dye A in comparison to cells with dye B, are often displayed in histograms.

The through-flow rate is typically about 10–100 cm/s. Therefore, a highly sensitive detection is necessary. According to the prior art, a confocal detection is carried out in order to limit the detection volume.

According to the prior art, line scanners, as they are called, are also used instead of point scanners (Corle, Kino, "Confocal Scanning Optical Microscopy and Related Imaging Systems", Academic Press 1996). The basic construction essentially corresponds to that of an LSM according to FIG. 2. However, instead of a point focus, a line is imaged in the specimen (3) and the specimen to be examined is scanned in only one direction (x or y). The image acquisition rate can be substantially increased by scanning a line instead of a point. Therefore, this scanning method can be used for observing high-speed processes in real time (real time microscopy). However, the optical axial resolution is reduced by a factor of approximately 1.4 compared with a point scanner.

In another arrangement for real time microscopy according to the prior art, the entire field to be examined is illuminated by an expanded light source. However, only special point patterns of the total field to be scanned are uncovered by a rapidly rotating disk. These methods are mostly known in technical literature as Nipkow disk methods (Corle, Kino, "Confocal Scanning, Optical Microscopy and Related Imaging Systems", Academic Press 1996).

Figure 3A:
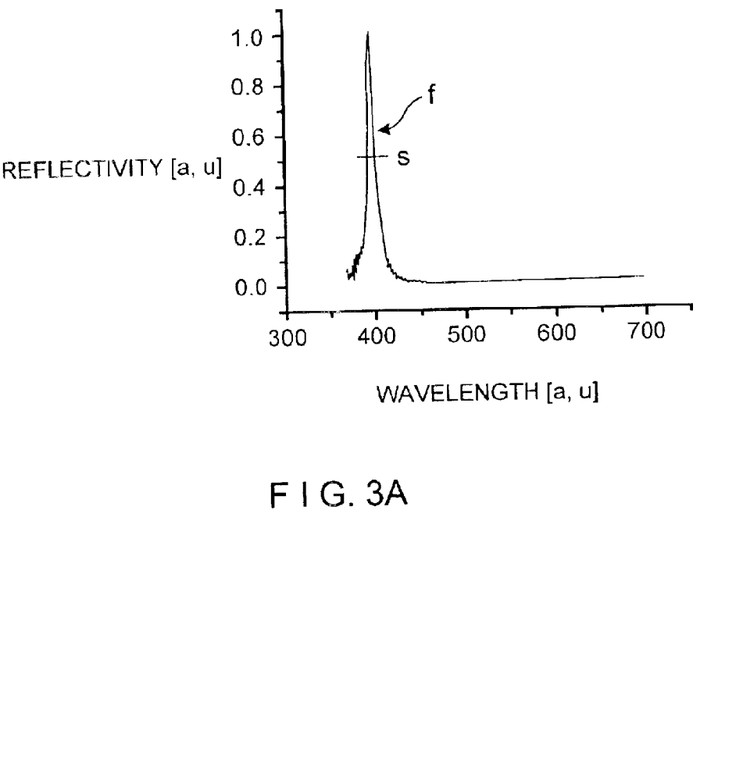
FIGS. 3A, 3B and 3C show a method known as structured illumination where the modulation depth of the optical imaging of an amplitude structure is used as a criterion for depth of field.
Figure 3B:
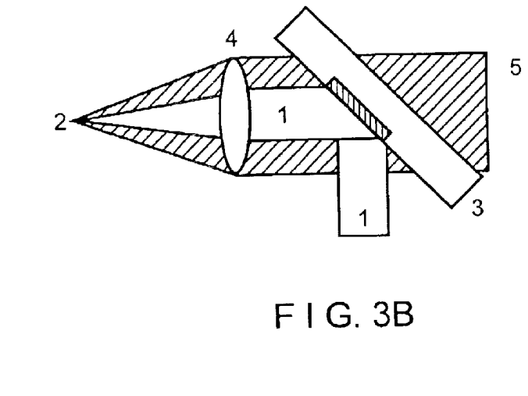
Figure 3C:
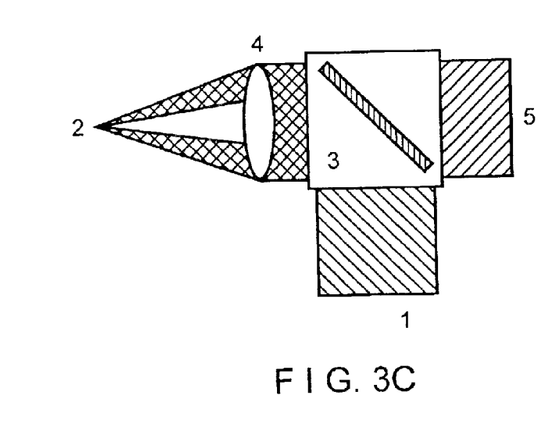

In another method according to the prior art, known as structured illumination (see FIG. 3), the modulation depth of the optical imaging of an amplitude structure (e.g., grating) is used as a criterion for depth of field. The image of the periodic structure is distinguished by the frequency of the modulation and the phase position (image phase) of the modulation. Various projection scenarios can be obtained by means of a phase shift of the structure at right angles to the optical axis. Generally, at least three phase images PB are required at 0°, 120° and 240° in order to calculate depth-discriminated optical sections without stripes. These phase images (PB) are subsequently calculated to form a (confocal) optical section image in an image processor by the following formula:

$$I_{Section}(x) = Const \cdot \sqrt{(I(x, 0°) - I(x, 120°))^2 + (I(x, 120°) - I(x, 240°))^2 + (I(x, 0°) - I(x, 240°))^2},$$

where I(x, angle) describes the intensity at the respective pixel in the corresponding phase image.

It is simplest to carry out the recording of three or more phase images sequentially. In this connection, it is assumed that the specimen is not moved during the measurement of the images. The section images or section stacks which are calculated from the phase images in this way can be displayed subsequently on a standard PC and monitor by means of 3-D evaluating software. The spatial resolution along the optical axis depends on the wavelength of the light, the numerical aperture of the objective and the modulation frequency. For a detailed description of the calculation algorithm, reference is had to T. Wilson, et al., "Method of obtaining sectioning by using structured light in a conventional microscope", Optics Letters 22 (24), 1997.

Arrangements for screening dyes, for example, in so-called chip readers are similar in optical construction to laser scanning microscopes. However, they scan an appreciably larger image field for the investigation of macroscopic specimens, for example, screening of active ingredients on a biochip. The edge length of the scan fields amounts to about 10 nm. These scan fields can be achieved, e.g., by increasing the scan angle of the galvoscanner, by arranging the specimen in an intermediate image of the microscope arrangement, for example, in FIG. 6A, or by a special objective arrangement (macroobjective) which images the intermediate image on the specimen in magnified manner.

According to the prior art, the separation of the excitation light from the light emitted by the specimen is carried out by spectral separation using Stokes shift by restricting the numerical aperture of the optics used for specimen illumination and detection or by splitting into different polarization directions.

Special dichroic beam splitters are used for the spectral separation of the excitation light from the light emitted by the specimen. As is shown in FIG. 3a, these dichroic beam splitters are usually constructed in such a way that they reflect the excitation light as efficiently as possible and transmit the light emitted by the specimen as efficiently as possible. The reflection factor (reflectivity) is shown as a function of wavelength. When using polarized excitation light, the minimum spectral bandwidth (s) of the reflected wavelength range is about 10 nm; the edge steepness (f) is usually greater than 5 nm. Therefore, according to the prior art, the light emitted by the specimen can be efficiently separated with a dichroic beam splitter when using an excitation wavelength. However, efficiency decreases when a plurality of dyes with a plurality of wavelengths are excited simultaneously (multifluorescence microscopy), since a spectral overlapping of the excitation light and the emitted light usually occurs. Further, a special beam splitter must be created each time when using different dyes with different absorption characteristics. In a wide field microscope, there is usually a broadband excitation of the specimen with light from a white light source with partial spectral overlapping of the excitation radiation and emitted radiation. Accordingly, the use of dichroic beam splitters according to the prior art results in a poor efficiency of separation of excitation light and emitted light.

The separation of excitation light from emitted light by restricting the numerical aperture of the specimen illumination optics (4 in FIG. 3b) can be carried out, for example, by illuminating the specimen with a restricted aperture, so that only the near-axis radiation (1) arrives in the direction of the specimen (2). Since the emission is carried out in all spatial directions, this light from the specimen (2) can be collected in the rest of the aperture area. The separation of the excitation light from the emitted light is carried out subsequently by a partially fully reflecting (black area) plane plate (3). The detection of the light emitted by the specimen is carried out in the radiating direction (5). The methods for dividing the numerical aperture known from the prior art are disadvantageous in that the efficiency of detection and the optical resolution of the arrangement are worsened by the restriction of the aperture. These two parameters are connected in this regard. For example, in order to achieve a highly efficient separation, the optical resolution is worsened.

When the specimen (2) is excited by polarized light (1 in FIG. 3c), a separation of the emitted light (5) that is not polarized is carried out by a polarizing splitter (3). However, only a maximum of 50% of the total light emitted by the specimen is detected.

In all of the methods according to the prior art, it is disadvantageous that the separation of the excitation light from the light emitted by the specimen is carried out in a wavelength-dependent manner or with a limited efficiency of typically 70% to 90%, depending on the required spectral characteristics and the quantity of illumination lines. In addition, the methods according to the prior art are not suitable for use in optical systems in which the beams strike the optical elements for separating at a sharp inclination, since the spectral characteristics are changed in this way, e.g., by a dichroic beam splitter, or the efficiency of the polarizing splitting is worsened in the case of a polarizing splitter.

OBJECT AND SUMMARY OF THE INVENTION

The primary object of the invention is to provide methods and arrangements by which the excitation light can be separated from the light radiation (e.g., fluorescence or luminescence) excited and/or backscattered in the specimen in a particularly advantageous manner with high efficiency. In contrast to the prior art, the separation is not wavelength-dependent and is therefore particularly suitable especially for use in multifluorescence microscopy, i.e., for simultaneous excitation of different dyes. Accordingly, fast switching between several excitation wavelengths or spectral detection wavelength ranges—so-called multitracking, as described in EP977069 A2—can be realized in a particularly simple manner. Further, it is possible to separate the light scattered by the specimen in the direction of the detector from the light reflected on a direct path. The element for separating the excitation light radiation from the light radiation which is excited and/or backscattered in the specimen is especially suitable for installing in locations where sharp beam inclination angles occur. Unlike the arrangements for separating the excitation beam path from the detection beam path according to the prior art, optical resolution is not impaired by the arrangements according to the invention.

Further, the illumination distribution can be manipulated at the site of specimen interaction. This makes it possible to scan so-called regions of interest (ROI) in real time. In addition, illumination methods known from wide field microscopy such as oblique illumination can be realized.

The solution according to the invention can be used in image-generating microscope systems as well as in analytic microscope systems. The microscope systems are image-generating systems such as laser scanning microscopes for three-dimensional examination of biological preparations with an optical resolution of up to 200 nm, nearfield scanning microscopes for high-resolution examination of surfaces with a resolution of up to 10 nm, fluorescence correlation microscopes for quantitative determination of molecular concentrations and for measuring molecular diffusions. Also included are methods based on fluorescence detection for screening dyes and methods for flow cytometry.

In all of the systems mentioned above, fluorescent dyes are used for specific labeling of the preparations. The above-stated objective is achieved by methods and arrangements according to the independent patent claims. Preferred further developments are indicated in the dependent claims.

The quantity of dye signatures that may be used simultaneously, i.e., the quantity of characteristics, for example, of cells that can be investigated simultaneously, can be increased by means of the methods according to the invention. When the spectral signatures of the individual dyes overlap extensively or are very close to one another, the detected wavelength range or numerical aperture must be limited, according to the prior art, for separate detection of the fluorescence signals of individual dyes. This reduces the sensitivity of detection, i.e., increases the noise of the detectors, because greater amplification must be used. This is avoided by the methods and arrangements according to the invention.

DESCRIPTION OF THE PREFERRED EMBODIMENTS

The following description will amplify upon various arrangements by which the light radiation (hereinafter, detection light) excited and/or backscattered in the specimen can be separated from the excitation light efficiently and independent from wavelength. The arrangements are accordingly suitable in particular for fast multitracking. In the following context, light radiation which is excited in the specimen is light which is radiated from the specimen in an undirected manner, preferably in a large solid angle, particularly fluorescent and luminescent light excited in the specimen.

1. Wide Field Microscope

Figures 4A, 4B:
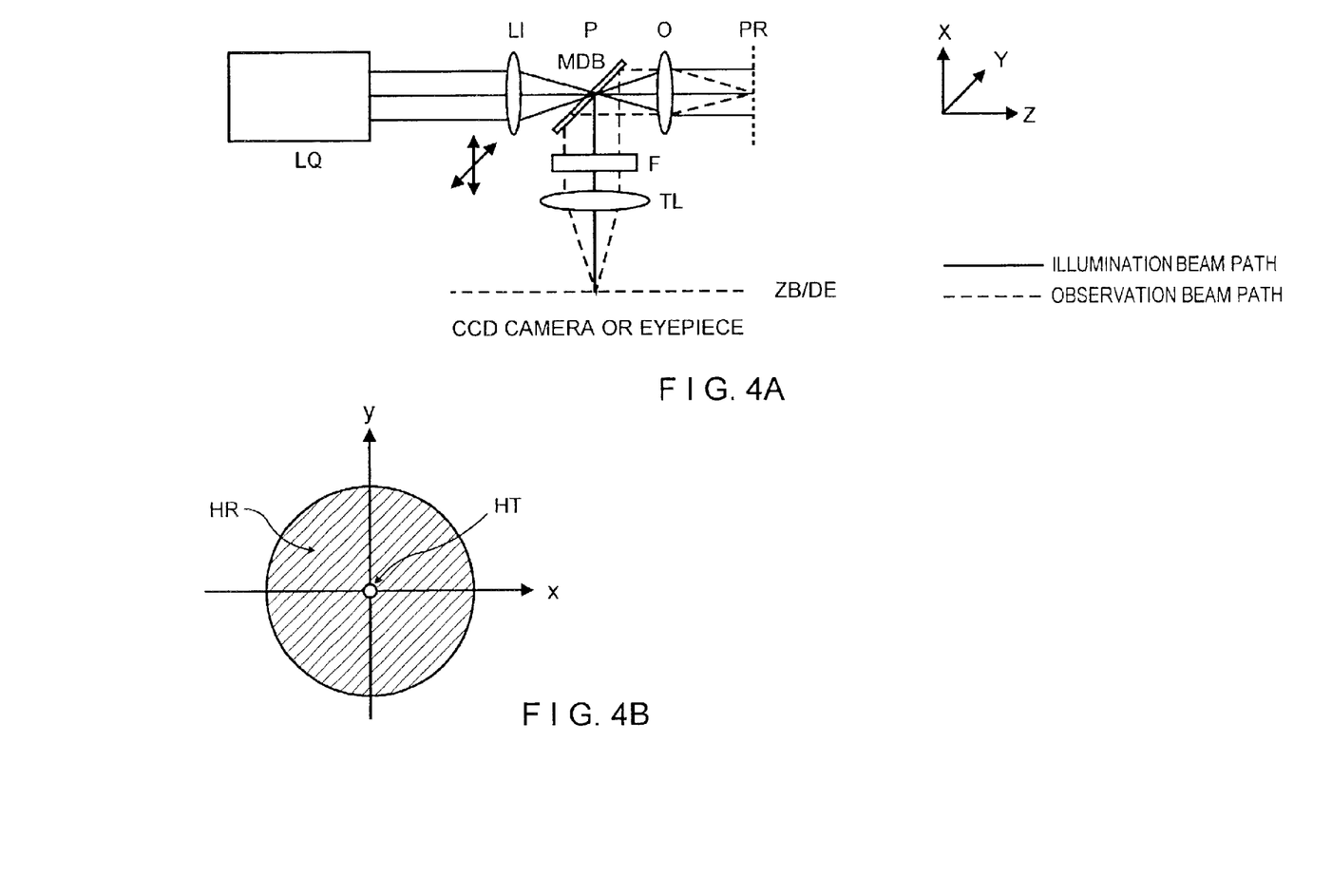
FIG. 4A illustrates in schematic form a wide field microscope.
FIG. 4B shows an element of the wide field microscope, MDB, which carries out the separation of excitation light and detection light.

The arrangement according to the invention for a wide field microscope is shown schematically in FIG. 4A. In a wide field microscope, the specimen is to be illuminated homogeneously in a plurality of points on the specimen simultaneously in the field to be investigated by a light source usually having a broadband spectrum. For this purpose, the light source LQ is focused by optics L1 in a pupil of the microscope device, i.e., in or in the vicinity of the back focal plane of the objective or in a plane conjugate to the back focal plane of the objective (back focal plane P is shown in the drawing). The light from the light source is imaged with a parallel beam in the specimen PR to be investigated through additional optics O, e.g., the microscope objective, wherein P lies exactly in its back focal plane. The solid lines show the illumination beam path. The observation beam path, e.g., in fluorescence excitation, is shown in dashed lines.

Based on the type of specimen interaction, e.g., with fluorescence excitation or luminescence excitation, the light radiated from the specimen has low spatial coherence. This means that each point excited in the specimen radiates as a point radiator in all spatial directions essentially independent from the neighboring points. The optics 0 (e.g., a microscope objective) image the individual point radiators together with the tube lens TL in an intermediate image plane ZB of the microscope device, the pupil P being uniformly illuminated by mutually incoherent wavefronts of different propagation directions (beam path indicated by dashes). A CCD camera or an eyepiece can be used for detection and/or observation of the specimen in the intermediate image plane as is known from the prior art. When recording fluorescence or luminescence, an emission filter (dichroic filter) F is swiveled in for suppression of the excitation light backscattered from the specimen.

The element MDB according to the invention shown in FIG. 4B which carries out the separation of excitation light and detection light is located in the pupil P. MDB is fully reflecting in the area HR shown in gray in the drawing. The area HT shown in white around the coordinate origin of XY is highly transmissive particularly for the wavelength region in which the specimen excitation is to be carried out. In the simplest case, the HT area can be a hole in the otherwise reflecting element. The excitation light is focused through the HT area according to the invention. The light reflected on a direct path from the specimen arrives again at the light source particularly through the HT area. The excitation light which is C) diffusely scattered by the specimen and/or the light which is excited in the specimen strikes the entire surface of the MDB corresponding to the pupil size of the microscope optics, the portion striking the HR area being deflected in direction TL and made available for observation in the intermediate image. Only the portion of the detection radiation falling on the HT area is lost in this arrangement at MDB. The ratio of the surfaces of HT to HR is:

$$R = \frac{A_{Pupil} - A_{HT}}{A_{Pupil}} = \frac{r^2_{Pupil} - r^2_{HT}}{r^2_{Pupil}},$$

where the radius for the HR area in a wide field microscope is typically about 5 mm and the HT area is approximately <0.5 mm. Accordingly, the ratio and therefore the efficiency of the beam splitting of NIMB is R=99%. This efficiency is not dependent on the utilized wavelength.

The angle at which the illumination strikes the specimen can be varied by a slight displacement of the lens L1 vertical to the optical axis. Accordingly, depending on the adjustment, different illumination scenarios such as oblique illumination or darkfield illumination can be adjusted.

2. Wide Field Microscope with Structured Illumination

Figure 5A:
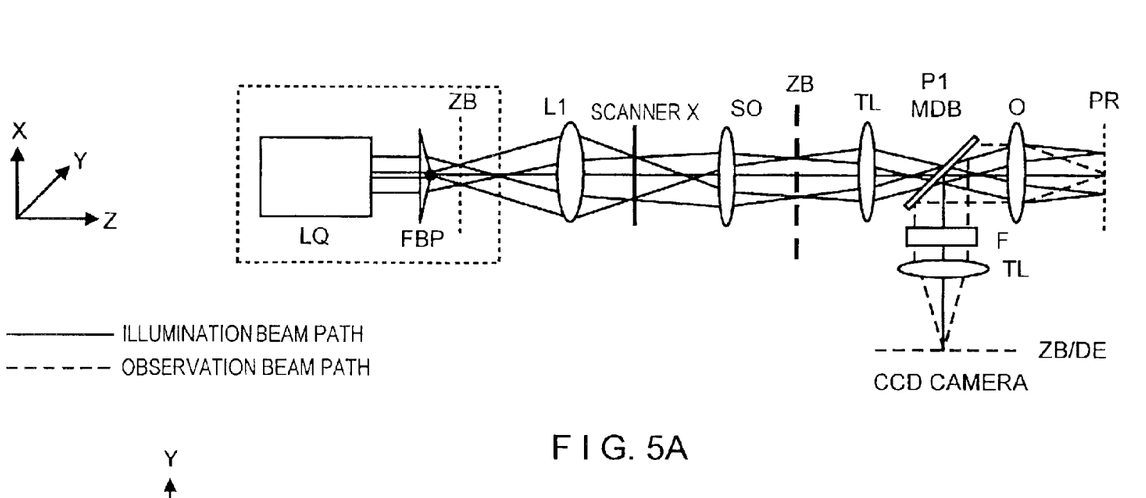
FIG. 5A shows an arrangement in schematic form, according to the invention, for a wide field microscope with structured illumination.

FIG. 5A shows an arrangement, according to the invention, for a wide field microscope with structured illumination. The illumination beam path of the microscope arrangement is shown by solid lines. The observation beam path is shown in dashed lines. The light of the light source LQ is split into two partial beams of the same intensity, e.g., by a Fresnel biprism FBP, which intersect at a small angle (typically less than 5°) in the intermediate image ZB. Other methods for beam splitting are known from the prior art, for example, DE19904592A1. The two partial beams are focused through optics L1 at different locations in a first pupil (scanner X) of the microscope arrangement. In another beam path, the pupil (scanner X) of the microscope arrangement (corresponds to a plane conjugate to the back focal plane of the objective) is imaged via scan optics SO, tube lens TL in the objective pupil P1. The specimen PR is illuminated in wide field through the objective O with two partial beams at a small angle, so that an intensity modulation, i.e., a sinusoidal interference structure, occurs in the specimen. The phase position of the sinusoidal structure can be shifted in the direction of the specimen plane by means of the scanner X. Different projection scenarios can be achieved by means of a phase shift of the structure vertical to the optical axis, For these different projection scenarios, the detection of phase images is carried out with a camera in the intermediate plane ZB/DE.

Figure 5B:
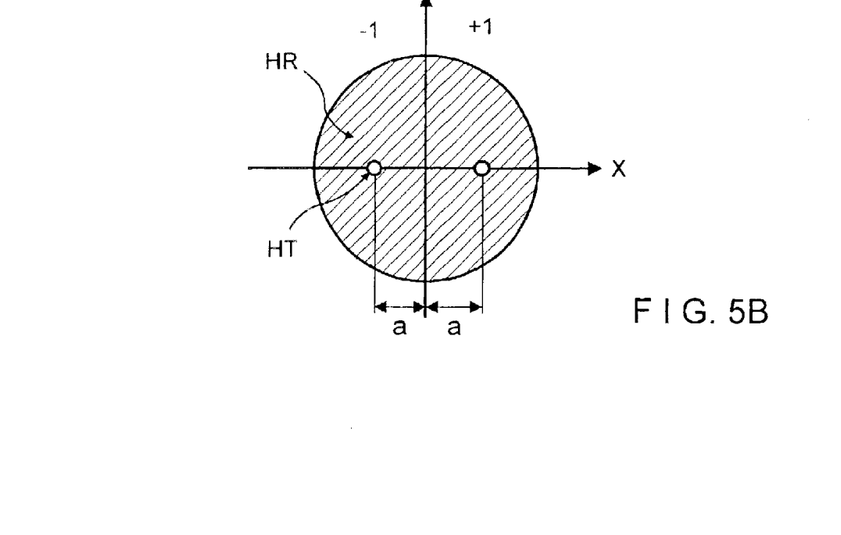
FIG. 5B shows the optical element, MDB, for the separation of excitation light and detection light.

The separation of excitation light and detection light is carried out with the optical element MDB which is shown in FIG. 5B. MDB is fully reflecting in the gray area HR. The white areas HT are highly transmissive particularly for the wavelength range in which the specimen excitation is to be carried out. In the simplest case, the HT areas can be holes in the otherwise reflecting element. The two partial beams of excitation light are focused through the HT area according to the invention. The light reflected on a direct path from the specimen arrives again at the light source particularly through the HT areas. The excitation light which is diffusely scattered in the specimen and/or the light which is excited in the specimen strikes the entire surface of the MDB corresponding to the pupil size of the microscope optics, the portion striking the HR area being deflected in direction TL and made available for observation in the intermediate image. Only the portion of the detection radiation from the specimen impinging on the HT areas is lost in this arrangement at MDB. However, the ratio of the surfaces of HT to HR is:

$$R = \frac{A_{Pupil} - A_{HT}}{A_{Pupil}} = \frac{r_{Pupil}^2 - 2 \cdot r_{HT}^2}{r_{Pupil}^2},$$

where the radius for the HR area in a wide field microscope is typically about 5 mm add the HT area is approximately <0.5 mm. Accordingly, the ratio and therefore the efficiency of the beam splitting of MDB is about R=98% independent from the wavelength.

Generally, at least two phase images PB at 0° and 180° are required for calculation of depth-discriminated optical sections without stripes. These phase images (PB) are subsequently calculated in an image processor to form a (confocal) optical section image and are displayed on a monitor.

3. Line Scanner

Figure 6A:
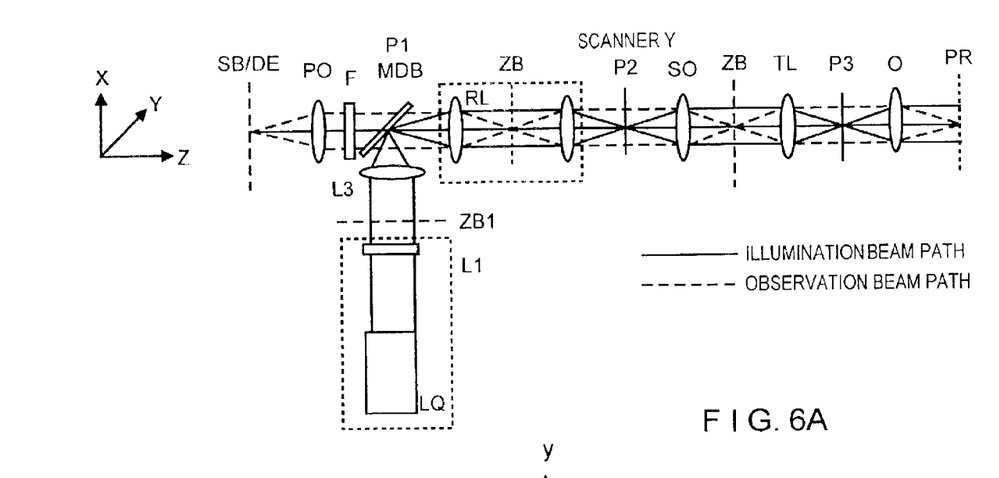
FIG. 6A shows a line scanning arrangement, according to the invention, shown in schematic fashion.

The arrangement, according to the invention, for a line scanner is shown schematically in FIG. 6A. The solid lines represent the illumination beam path. In a line scanner, the specimen is illuminated by a line focus, e.g., along the X coordinate which is shifted in the coordinate vertical to the line. For this purpose, the light source LQ is focused in a line-shaped manner in an intermediate image plane ZB1 of the microscope device by means of optics L1. A diffraction-limited line-shaped intensity distribution results along X on the specimen by means of focusing with L1 in Y-direction in ZB1, for example, through a cylindrical lens in the specimen plane. Further, the line-shaped intensity distribution along X on the specimen can be carried out by diffractive or holographic elements according to the prior art ("Diffractive optics improve product design", Photonics Spectra, Laurin Publishing Co., Inc., September 1995). Further, a Powell lens, as it is called, such as is described in U.S. Pat. No. 4,826,299 can be used. The latter element generates a more homogeneous intensity distribution along the line compared to the cylindrical lens with Gaussian illumination intensity distribution as is typical, e.g., for single-mode lasers. For this purpose, the Powell lens and the diffractive or holographic elements are arranged in a particularly advantageous manner, for example, in a pupil plane of the microscope device, between the light source and scanner. The light is imaged in the pupil P1 of the microscope arrangement with additional optics L3. A line focus results along the Y-axis in the pupil planes of the microscope arrangement. The pupil planes P1 and the scanner (y—P3) are pupil planes of the microscope arrangement that are conjugate to one another and to the back focal plane of the objective (P3), so that the line-shaped intensity distribution which is focused in a diffraction-limited manner can be moved by the scanner vertical to these pupil planes (y coordinate in the specimen). The imaging of ZB1 in the specimen is carried out via the scan optics (SO), the tube lens (TL) and the objective (O). The relay optics (RL1) generate the conjugate pupil planes P1 and P2 of the microscope arrangement. In special arrangements according to the prior art, the relay optics can also be dispensed with. For example, they can be omitted when the distance between P1 and P2 is reduced. Further, the element MDB arranged on a scanner can also be used directly in P1 for scanning the line focus in Y direction. In this arrangement, the relay optics and accordingly the pupil plane P2 can be entirely omitted. In principle, the transmitting optics L1 for forming the line can also be replaced by a reflecting element, e.g., a cylindrical mirror, whose focal point lies on a P1. The cylindrical mirror is arranged at 45° in the xz-plane shown in FIG. 6A. The mirror also has its focusing effect in this plane. Further, the beam path is angled by 90° to the light source by the mirror. The observation beam path, e.g., in fluorescence excitation, is shown in dashed lines.

Based on the type of specimen interaction, e.g., with fluorescence excitation or luminescence excitation, the light emitted by the specimen has a low spatial coherence. This means that each point excited in the specimen radiates as a point radiator in all spatial directions essentially independent from the adjacent points. The optics O (e.g., a microscope objective) image the individual point radiators together with the tube lens TL in an intermediate image plane ZB of the microscope device, wherein the pupil P is uniformly illuminated by wavefronts of different propagation direction which are substantially incoherent relative to one another. Subsequently, the light of the specimen is focused by means of imaging optics (PO) with confocal detection through a slit diaphragm (SB) (slit position in longitudinal direction in X-direction in the drawing), so that detection light occurring outside of the focus is suppressed. With nondescanned detection, the diaphragm can be omitted. A line detector or surface detector (DE) (position of line in X-direction) is located behind the slit diaphragm and detects the light radiation excited and/or backscattered in the specimen in a spatially resolved manner (along the line focus). The line focus is scanned in one spatial direction by the galvoscanner (y). When recording fluorescence or luminescence, an emission filter (dichroic filter) F is swiveled in for suppression of the excitation light backscattered from the specimen.

Figure 6B:
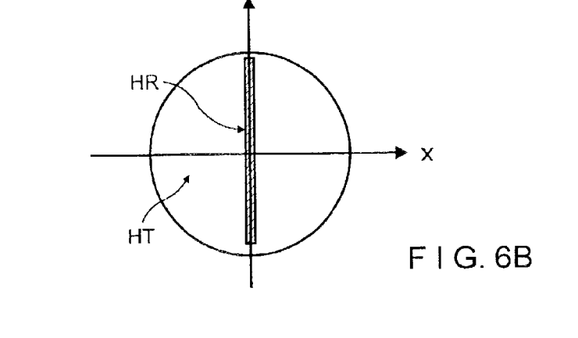
FIG. 6B again shows the element, MDB, which carries out the separation of the excitation light from the detection light.

The element MDB shown in FIG. 6B which carries out the separation of the excitation light from the detection light is located in pupil P1. For purposes of illustration, the element MDB is shown in an enlarged view.

MDB is fully reflecting in the gray area HR. The white area HT is highly transmissive particularly for the wavelength range in which the specimen excitation is to be carried out. The outer border of the MDB shows the pupil diameter of the microscope unit. In the simplest case, the HR area can be a narrow mirror. According to the invention, the excitation light is focused on the HR area. The light reflected on a direct path from the specimen arrives again at the light source particularly on the HR area. The excitation light which is diffusely scattered in the specimen and/or the light which is excited in the specimen strikes the entire surface of the MDB corresponding to the pupil size of the microscope optics, the portion striking the HT area arriving at the intermediate image SB/DE for observation. Only the portion of the detection radiation impinging on the HR area is lost in this arrangement at MDB. The ratio of the surfaces of HT to HR is:

$$R = \frac{A_{Pupil} - A_{HT}}{A_{Pupil}} = \frac{\pi \cdot r_{Pupil} - 2 \cdot b_{HT}}{\pi \cdot r_{Pupil}},$$

where the pupil radius for the HT area in a microscope is typically about 5 mm and the width of the HR area is approximately br<0.25 mm. Accordingly, the ratio and therefore the efficiency of the beam splitting of MDB is R=97% independent from the wavelength.

4. Structured Line Scan—Descanned

Figures 7A, 7B:
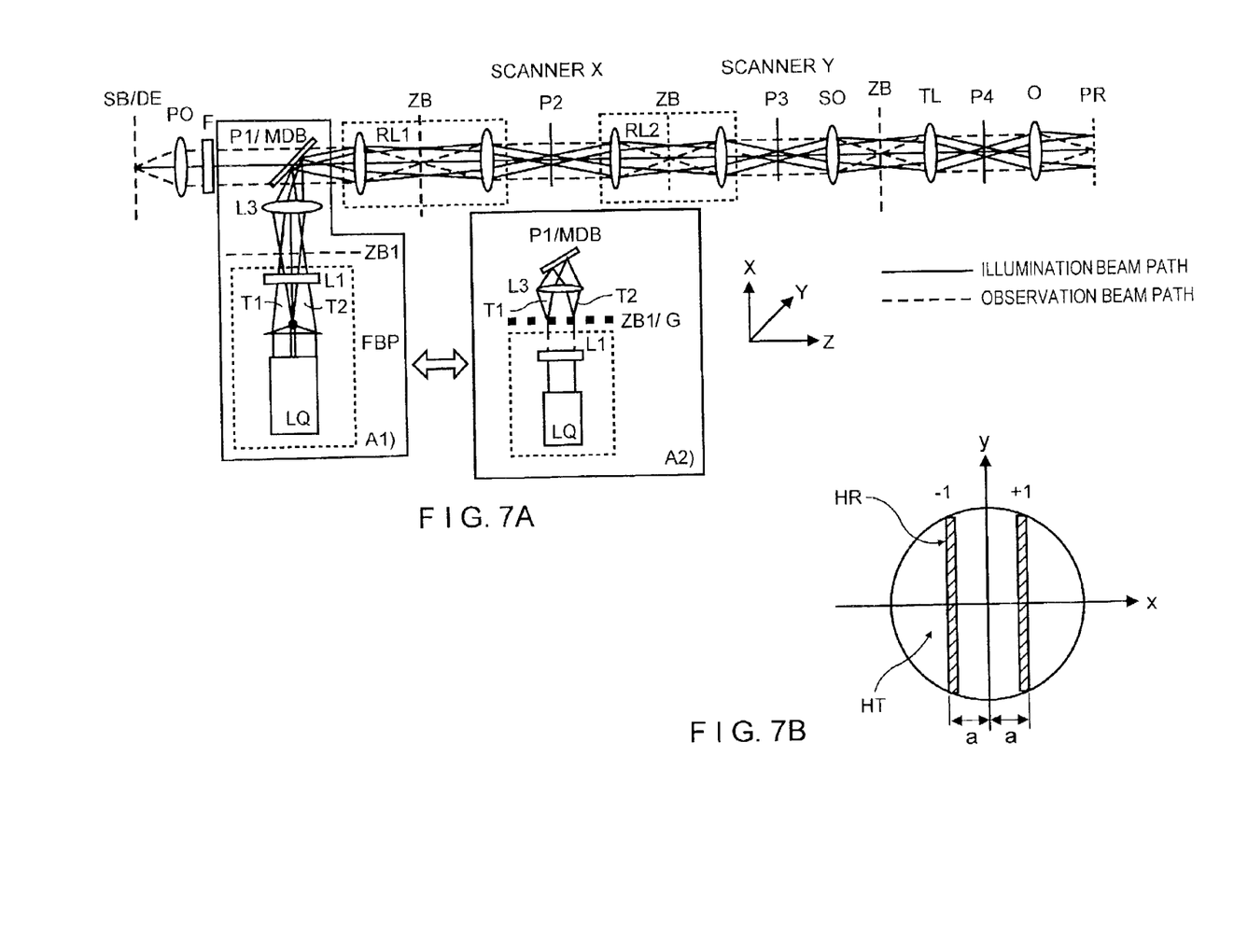
FIG. 7A schematically shows an arrangement according to the invention for a line scanner with structured illumination.
FIG. 7B shows element MDB which carries out the separation of the excitation light from the detection light.

The arrangement, according to the invention, for a line scanner with structured illumination is shown schematically in FIG. 7A. The solid lines represent the illumination beam path. In a line scanner with structured illumination, the specimen is illuminated by a line focus which is shifted in the coordinate vertical to the line. The intensity varies along the line periodically. For this purpose, the light source LQ is split through an optical element, e.g., a Fresnel biprism, into two partial beams (TI/T2) which intersect in an intermediate image plane ZB1 of the microscope device in the XZ plane and are focused in the plane of the MDB. Other methods for beam splitting are known from the prior art. In addition, the light is focused in a line-shaped manner in ZB1 by means of further optics L1. In this case, L1 is identical to element L1 which was described with reference to FIG. 6A. A diffraction-limited structured line-shaped intensity distribution results along X on the specimen by means of focusing in Y-direction in ZB1.

The light is imaged in the pupil P1 of the microscope arrangement with additional optics L3. Two line foci result along the Y-axis in the pupil planes of the microscope arrangement. The pupil planes P1 and the two scanners (y—P3) and (x—P2) are pupil planes of the microscope arrangement which are conjugate to one another and to the back focal plane of the objective (P4), so that the structured line-shaped intensity distribution which is focused in a diffraction-limited manner is moved by the scanners along X vertical to or along these pupil planes (y coordinate and x-coordinate in the specimen). The imaging of ZB1 in the specimen is carried out by the scan optics (SO), the tube lens (TL) and the objective (O). The relay optics (RL1 and RL2) generate the conjugate pupil planes P1 to P3 of the microscope arrangement. In special arrangements according to the prior art, the relay optics can also be dispensed with. For example, they can be omitted when the distance between P2 and P3 is decreased. Further, the element can also be used directly in P1 for scanning the line focus in X-direction and Y direction. In this arrangement, the pupil plane P2 or P3 can be omitted entirely.

The observation beam path, e.g., in fluorescence excitation, is shown in dashed lines and is analogous to that already described with reference to FIG. 6A.

A line detector or surface detector (DE) (position of line in X-direction) is again located in DE and detects the detection light in a spatially resolved manner (along the line focus). When recording fluorescence or luminescence, an emission filter (dichroic filter) F is swiveled in for suppression of the excitation light backscattered from the specimen.

The element MDB shown in FIG. 7B which carries out the separation of the excitation light from the detection light is located in the pupil P1. MDB is fully reflecting in the gray areas HR. The white area HT is highly transmissive particularly for the wavelength range in which the specimen excitation is to be carried out. The outer border of the MDB shows the pupil diameter of the microscope unit. Distance a is given by the angle splitting of the two partial beams at FBP and is approximately 1 mm, depending on the construction of the optical arrangement. According to the invention, the two partial beams of excitation light are focused on the HR areas. The light reflected on a direct path from the specimen arrives again at the light source particularly on the HR areas. The excitation light which is diffusely scattered in the specimen and/or the light which is excited in the specimen strikes the entire surface of the MDB corresponding to the pupil size of the microscope optics, the portion striking the HT area arriving for detection in the intermediate image SB/DE. Only the portion of the detection radiation impinging on the HR areas is lost in this arrangement at MDB. The ratio of the surfaces of HT to HR is:

$$R = \frac{A_{Pupil} - A_{HT}}{A_{Pupil}} \approx \frac{\pi \cdot r_{Pupil} - 4 \cdot b_{HT}}{\pi \cdot r_{Pupil}},$$

where the pupil radius for the HT area in a microscope is typically about 5 mm and the width of the HR area is approximately $b_{HT}$<0.25 mm. Accordingly, the ratio and therefore the efficiency of the beam splitting of MDB is R=94%.

Generally, at least two phase images PB at 0° and 180° are required for calculation of depth-discriminated optical sections without stripes. The phase images are generated by the Y-scanner in different positions of the X-scanner. These phase images (PB) are subsequently calculated in an image processor to form a (confocal) optical section image and are displayed on a monitor. In principle, the slit diaphragm can also be dispensed with in this case, since the modulation depth of the optical imaging of the structured line focus serves as a criterion for the depth of field.

In FIG. 7, by way of example, a structured scan line is generated by a line grating G arranged after the light source and L1 (arrangement according to 7A2) instead of by two interfering partial beams. The line grating G is located, for example, in the intermediate plane ZB1 and has a sinusoidal intensity curve. The imaging of the spatial frequencies generated at G is carried out via L3 in the plane of the MDB (pupil plane).

5. Structured Line Scan—Partially Descanned

Figure 8A:
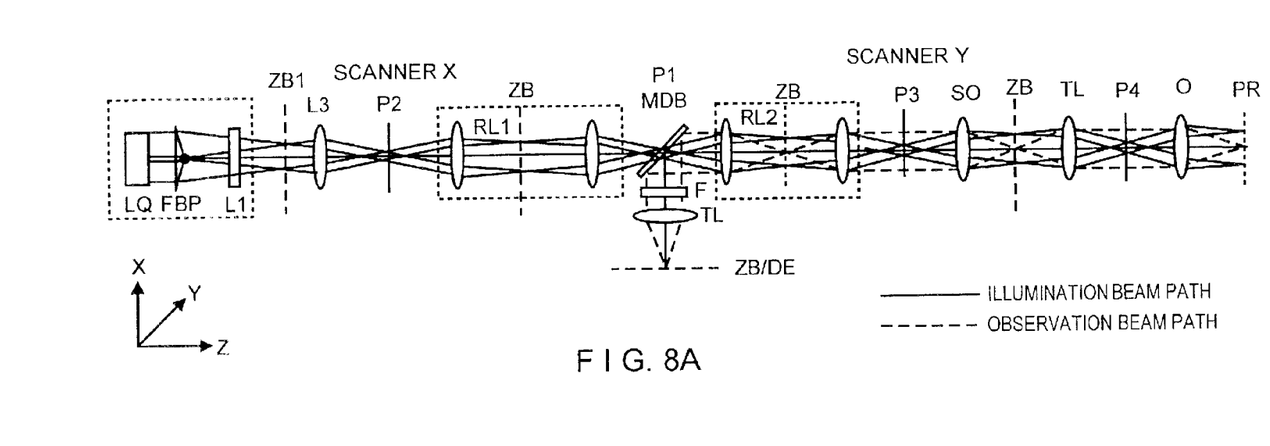
FIG. 8A schematically shows an arrangement in accordance with the invention in which the detection in which the detection light is descanned in only one coordinate.
Figure 8B:
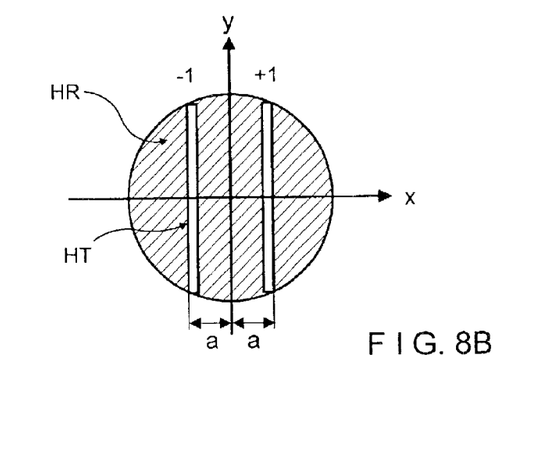
FIG. 8B shows the MDB element of FIG. 8A.

FIG. 8A shows an arrangement, according to the invention, in which the detection light is descanned in only one coordinate, i.e., it travels only via the Y-scanner. This has the advantage that the quantity of optical elements in the observation beam path can be reduced. The illumination beam path is analogous to that shown in FIG. 7A. However, in element MDB (see FIG. 8B), the HT and HR areas are reversed compared to the view in 7b. The excitation light is focused through two slits. The light of the specimen to be observed is reflected out laterally at MDB P1 and is detected by a detector DE arranged in ZB.

6. Structured Line Scan—Nondescanned

Figure 9:
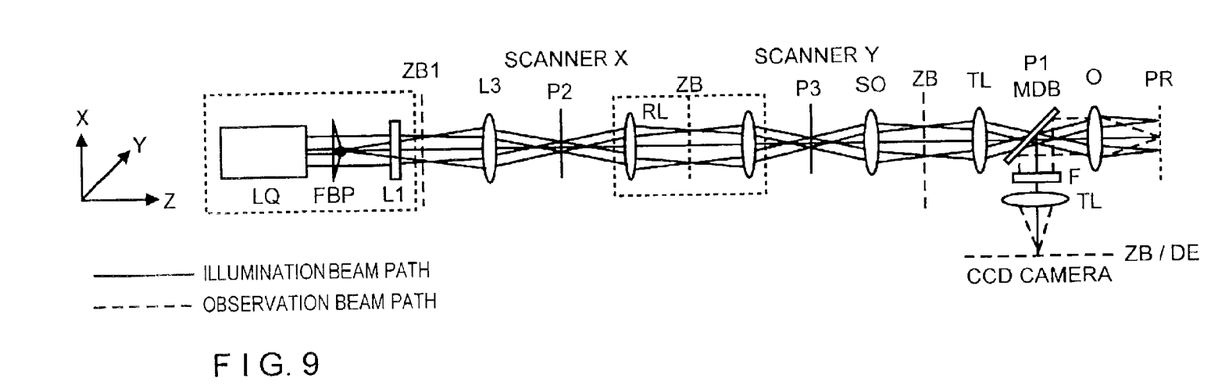
FIG. 9 schematically shows another arrangement in which the detection light is not descanned, but is measured only by a CCD camera in an intermediate image.

FIG. 9 shows another arrangement, according to the invention, in which the detection light is not descanned, i.e., does not travel via any scanners, but is measured only by a CCD camera in an intermediate image (e.g., TV port of a microscope). This has the advantage that the quantity of optical elements in the observation beam path can be considerably reduced. Further, special CCD cameras, e.g., time-gated cameras, can be used for three-dimensionally resolved measurement of the fluorescence lifetime. The illumination beam path is analogous to that shown in FIG. 8A. The light of the specimen to be observed is reflected out laterally at MDB P1 and is detected by a detector DE arranged in ZB.

The reflection characteristics of areas HT and HR can also be reversed in all of the arrangements according to the invention, so that the HR area is highly transmissive in this case. In this event, the beam path at the MDB proceeding from the light source LQ must be switched with the beam path from the MDB to the detector DE. Further, the element can also comprise a polarizing element when using polarized excitation light. Its operation is described by way of example with reference to FIG. 7. In this case, the excitation light at MDB is reflected in the HR areas. When using polarized excitation light, polarizing splitters can also be arranged in the HR areas instead of mirrors. Only 50% of the detection light is still lost in the HR area when using polarizing elements.

The arrangements in FIGS. 6 to 9 are also suitable for scanning regions of special interest ROI (see EP977069A2. In this case, the laser light is unblocked only for determined regions which are selected beforehand by the user.

The length of the illumination line (along the X-coordinate) can be carried out, for example, by changing the effective focal length of L3 (see FIG. 7, for example). This results in a change in the imaging scale of the microscope arrangement. The change in focal length can be carried out especially quickly in particular by adaptive optics. A further possibility for influencing the line consists in that the line is cut off in ZB1 by an adjustable mechanical diaphragm or two individual knife edges whose width is adjustable. In addition, the position of the line section in the specimen can be influenced by displacing L1 vertical to the optical axis in ZB1, the diaphragm or through the X-scanner. Regions in the specimen which have been optionally defined beforehand by the user can accordingly be acted upon by different excitation light powers.

Figure 10:
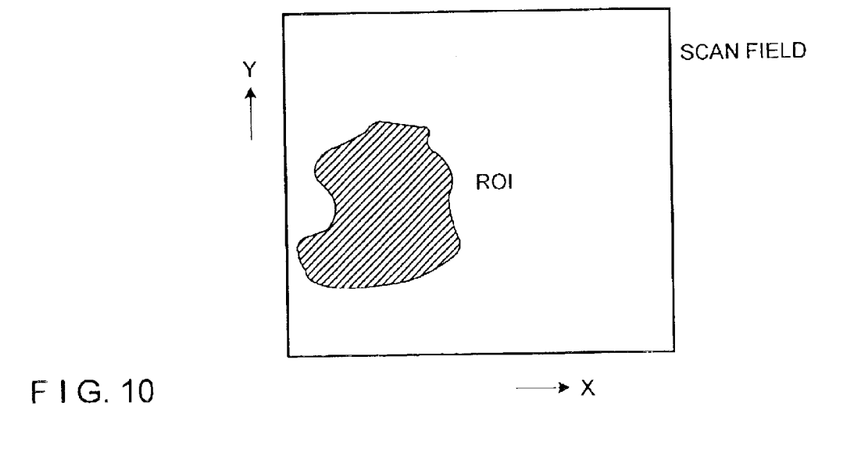
FIG. 10 shows an ROI, in accordance with the invention, in a scan field where the illuminated area is shown in black.

The advantage of this method compared to the method according to the prior art is that the ROIs can be scanned in real time. By way of example, FIG. 10 shows a ROI in a scan field. The illuminated area is shown in black. The control of the scanners X and Y and diaphragm or MDB is carried out in combination with the element for adjusting the light output corresponding to the ROI to be investigated. The scan field represents the entire section of the specimen that can potentially be investigated by the arrangement.

In principle, the function of the scanners shown herein can also be performed instead by a corresponding scan table (object scanner) at least in one While the foregoing description and drawings represent the present invention, it will be obvious to those skilled in the art that various changes may be made therein without departing from the true spirit and scope of the present invention.

What is claimed is:

1. An arrangement for the optical detection of light radiation which is excited and/or backscattered in a specimen, comprising:

means for focusing specimen illumination in and/or in the vicinity of a pupil plane of a beam path between a specimen plane and a detection plane; and apparatus being provided in said pupil plane for spatially separating the illumination light from the detection light; wherein said apparatus comprises a beam splitter.

2. The arrangement according to claim 1, wherein fluorescent light and/or luminescent light and/or phosphorescent light and/or diffusely scattered illumination light coming from the specimen is detected.

3. The arrangement according to claim 1, wherein the apparatus for spatial separation comprises at least a reflecting first portion and at least a transmitting second portion, wherein the reflecting portion serves to couple in the illumination light and the transmitting portion serves to pass the detection light in the detection direction, or the transmitting portion serves to couple in the illumination light and the reflecting portion serves to couple out the detection light.

4. The arrangement according to claim 1, wherein a beam splitter is provided which has a central portion which is constructed so as to be reflecting or transmitting and which is surrounded by a second portion which is constructed so as to be transmitting or reflecting.

5. The arrangement according to claim 4, wherein the beam splitter is constructed as a H polarization splitter.

6. The arrangement according to claim 4, where in scanning is carried out with the beam splitter.

7. The arrangement according to claim 1, with oblique illumination for a wide field microscope.

8. The arrangement according to claim 7, wherein a lens which is displaceable vertical to the optical axis is provided.

9. The arrangement according to claim 1, wherein a wide field microscope with structured illumination is provided.

10. The arrangement according to claim 9, wherein a depth-resolved detection of the specimen is carried out.

11. The arrangement according to claim 1, in a laser scanning microscope.

12. The arrangement according to claim 1, wherein a line scanner is provided.

13. The arrangement according to claim 12, wherein the scanning line is overlaid with structured illumination.

14. The arrangement according to claim 12, wherein the length of the line is varied by varying the focal length and/or imaging scale of a microscope arrangement.

15. The arrangement according to claim 12, wherein the length of the line is varied by means of adaptive optics.

16. The arrangement according to claim 12, wherein the length of the line is varied by an adjustable diaphragm.

17. The arrangement according to claim 1, with descanned detection.

18. The arrangement according to claim 1, with partially descanned detection in one direction.

19. The arrangement according to claim 1, with nondescanned detection.

20. The arrangement according to claim 1, wherein the detection is carried out by a CCD camera.

21. The arrangement according to claim 1, wherein a sampling and/or detection of selected specimen areas is carried out.

22. An arrangement for the optical detection of light radiation coming from a specimen, comprising:

optics that focus specimen illumination in or near the vicinity of a pupil plane of a beam path between a specimen plane and a detection plane;

a spatial separator positioned in the pupil plane for spatially separating the specimen illumination from the detection light; and a detector device that detects the detection light coming from the spatial separator.

* * * * *